United States Patent
Dattawadkar et al.

(10) Patent No.: US 9,903,455 B2
(45) Date of Patent: Feb. 27, 2018

(54) TORQUE CONVERTER THRUST ASSEMBLY CONNECTING STATOR AND IMPELLER

(71) Applicant: Schaeffler Technologies AG & Co. KG, Herzogenaurach (DE)

(72) Inventors: Aditya Dattawadkar, Wooster, OH (US); Srinath Sistla, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 395 days.

(21) Appl. No.: 14/660,571

(22) Filed: Mar. 17, 2015

(65) Prior Publication Data
US 2016/0273635 A1 Sep. 22, 2016

(51) Int. Cl.
F16H 41/24 (2006.01)
F16H 45/02 (2006.01)
F16F 15/134 (2006.01)

(52) U.S. Cl.
CPC .............. *F16H 41/24* (2013.01); *F16H 45/02* (2013.01); *F16F 15/13469* (2013.01); *F16H 2041/246* (2013.01); *F16H 2045/0205* (2013.01); *F16H 2045/0221* (2013.01); *F16H 2045/0278* (2013.01)

(58) Field of Classification Search
CPC ................... F16H 2041/246; F16H 2045/0205
USPC .......................................................... 60/345
See application file for complete search history.

(56) References Cited

U.S. PATENT DOCUMENTS

| | | | |
|---|---|---|---|
| 4,027,757 A * | 6/1977 | Radke ............... | F16F 15/12313 192/213.31 |
| 4,049,093 A * | 9/1977 | Vukovich ............... | F16H 45/02 192/3.3 |
| 4,143,561 A * | 3/1979 | Melhorn ............... | F16F 15/129 192/214.1 |
| 5,188,575 A * | 2/1993 | Leising ..................... | F16H 3/66 192/48.613 |
| 6,006,878 A * | 12/1999 | Macdonald ............. | F16H 45/02 192/212 |
| 6,394,660 B1 * | 5/2002 | Butler, III ............... | F16C 19/30 384/620 |
| 2014/0097055 A1 | 4/2014 | Lindemann et al. | |
| 2014/0298786 A1 * | 10/2014 | Lindemann ............. | F16H 41/04 60/364 |
| 2015/0128582 A1 * | 5/2015 | Kawamoto ............. | F16D 41/12 60/345 |
| 2015/0167809 A1 * | 6/2015 | Simon ..................... | F16H 41/24 60/331 |

* cited by examiner

*Primary Examiner* — Thomas E Lazo
(74) *Attorney, Agent, or Firm* — Davidson, Davidson & Kappel, LLC

(57) ABSTRACT

A torque converter is provided. The torque converter includes an impeller and a stator. The stator includes a thrust assembly connected to both the stator and the impeller. The thrust assembly includes an axial thrust surface for axially contacting an axial surface of a radially extending wall of the impeller. A method of forming a torque converter is also provided. The method includes connecting a thrust assembly to a stator and connecting an impeller to the thrust assembly.

20 Claims, 3 Drawing Sheets

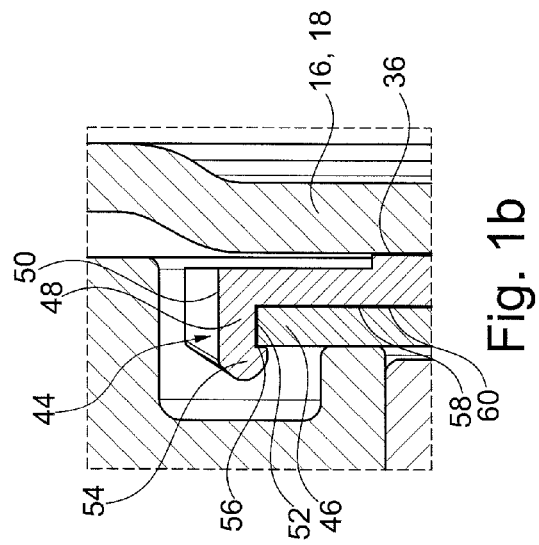
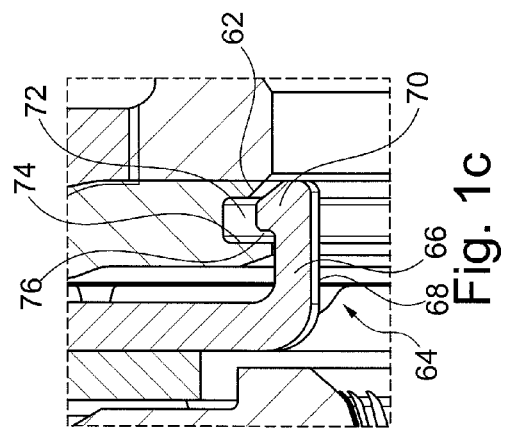
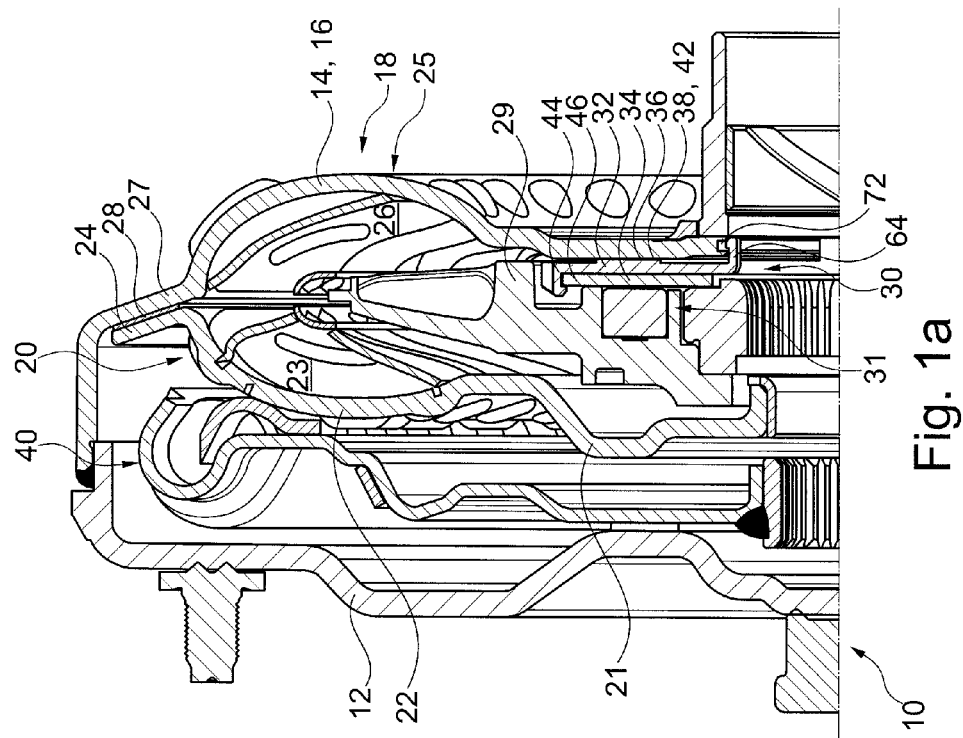

TORQUE CONVERTER THRUST ASSEMBLY CONNECTING STATOR AND IMPELLER

The present invention relates generally to torque converter and more specifically to torque converters including axially movable turbines and stators.

BACKGROUND OF INVENTION

U.S. Publication No. 2014/0097055 discloses a torque converter with an axially movable turbine used as a piston of a lockup clutch. In some embodiments, the torque converter includes a friction material ring attached to an axial thrust surface of the stator for transmitting a turbine and/or stator thrust load to the impeller.

BRIEF SUMMARY OF THE INVENTION

A torque converter is provided. The torque converter includes an impeller and a stator. The stator includes a thrust assembly connected to both the stator and the impeller. The thrust assembly includes an axial thrust surface for axially contacting an axial surface of a radially extending wall of the impeller.

A method of forming a torque converter is also provided. The method includes connecting a thrust assembly to a stator and connecting an impeller to the thrust assembly.

BRIEF DESCRIPTION OF THE DRAWINGS

The present invention is described below by reference to the following drawings, in which:

FIG. 1a shows a cross-sectional side view of a torque converter in accordance with an embodiment of the present invention;

FIG. 1b shows an enlarged view of a radially outer end of a thrust assembly of the torque converter shown in FIG. 1a;

FIG. 1c shows an enlarged view of a radially inner end of the thrust assembly of the torque converter shown in FIG. 1a;

DETAILED DESCRIPTION

Figure 2:
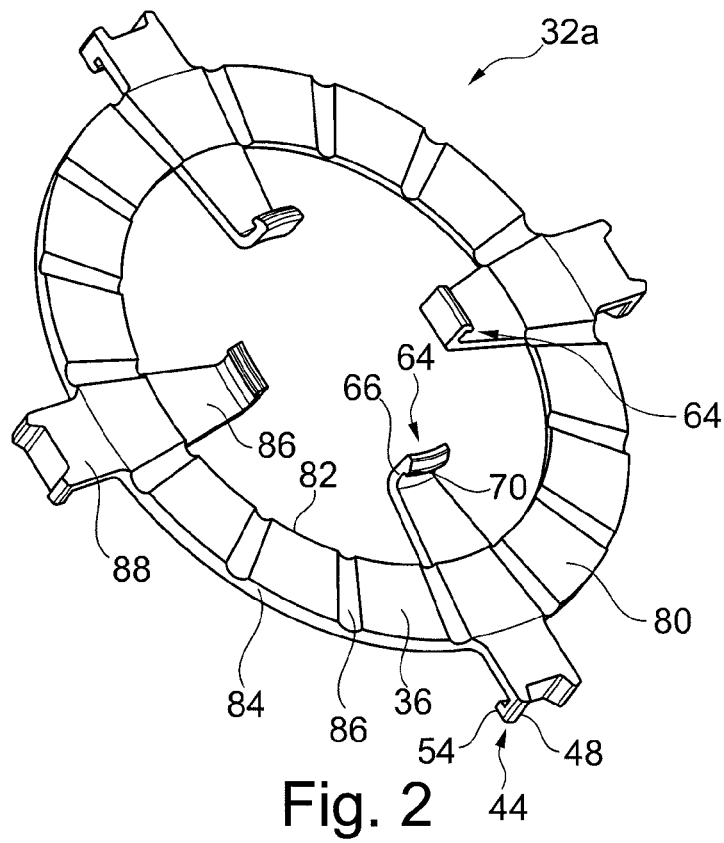
FIG. 2 shows a thrust washer in accordance with an embodiment of the present invention.

FIG. 1a shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20 that is configured to be axially slidable toward and away from impeller 18 to engage and disengage with impeller 18 so as to form a lockup clutch. Turbine 20 includes a turbine shell 21 including a rounded blade supporting portion 22 for supporting a plurality of turbine blades 23 at a front cover side of the blades 23. Radially outside of blade supporting portion 22, turbine shell 21 includes an outer radial extension 24 radially protruding outwardly from an outer circumference of blade supporting portion 22.

Impeller shell 16 includes a rounded blade supporting portion 25 for supporting a plurality of impeller blades 26. Radially outside of blade supporting portion 25, impeller shell 16 includes a radially extending wall 27 radially protruding outwardly from an outer circumference of a blade supporting portion 25. A friction material 28 is bonded onto a surface of outer radial extension 24 for engaging radially extending wall 27. In other embodiments, instead of or in addition to being bonded to outer radial extension 24, friction material 28 may be bonded to radially extending wall 27. Turbine 20 is connected to a damper assembly 40 that is circumferentially drivable by turbine 20 and is positioned between turbine 20 and front cover 12. Torque converter 10 also includes a stator 29 between turbine 20 and impeller 18 and a one-way clutch 31 supporting stator 29.

Torque converter 10 further includes a thrust assembly 30 connected to both stator 29 and impeller 18. FIG. 1b shows an enlarged view of a radially outer end of thrust assembly 30 and FIG. 1c shows an enlarged view of a radially inner end of thrust assembly 30. Thrust assembly 30 is sandwiched axially between stator 29 and impeller 18 and includes a thrust washer 32 and a centering plate 34. Centering plate 34 holds one-way clutch 31 in place within stator 29. Thrust washer 32 includes an axial thrust surface 36 for axially contacting an axial surface 38 of a radially extending wall 42 of impeller 18. Thrust washer 32, at least at thrust surface 36, is made of a wear resistant material, for example Torlon. In this embodiment, centering plate 34 is axially fixed to stator 29, for example in a conventional manner, and thrust washer 32 is axially fixed to center plate 34 to hold thrust assembly 30 in place on stator 29. More specifically, thrust washer 32 includes radially outer connectors 44 connected to a radially outer end 46 of centering plate 34. Radially outer connectors 44 are each snap-fit onto radially outer end 46 of centering plate 34 such that an axially extending section 48 defining an outer radial surface 50 of thrust washer 32 contacts and an outer radial surface 52 of centering plate 34 and a radially inward projecting protrusion 54 extends from the free end of axially extending section 48 to contact a first axial surface 56 of centering plate 34 to secure thrust washer 32 axially on centering plate 34. By this snap-fit connection, a further axial surface 58 of thrust washer 32, which is opposite of thrust surface 36, contacts a second axial surface 60 of centering plate 34, which is opposite of first axial surface 56.

In the embodiment shown in FIG. 1c, thrust washer 32 is axially fixed to an inner circumferential surface 62 of impeller 18 to hold thrust assembly 30 in place on impeller 18. More specifically, thrust washer 32 includes radially inner connectors 64 connected to an inner circumferential surface 62 of impeller 18. Radially inner connectors 64 are snap-fit onto inner circumferential surface 62 of impeller 18 such that an axially extending section 66 defining an inner radial surface 68 of thrust washer 32 extends toward inner circumferential surface 62 of impeller 18 and a radially outward projecting protrusion 70 extends from the free end of axially extending section 66 to extend into a radially and circumferentially extending annular slot 72 formed in inner circumferential surface 62 to secure thrust washer 32 axially on impeller 18 to prevent thrust assembly 30 from moving away from impeller 18. More specifically, to prevent thrust assembly 30 from moving away from impeller 18, impeller includes an axial edge 74 defining slot 72 that contacts protrusion 70 if stator 29 along with the thrust washer 32 tries to move towards turbine 30. When stator 29 axially thrusts against impeller 18, a clearance 76 is formed between axial edge 74 and protrusion 70. Accordingly, radially inner connectors 64 contact impeller 18 only when stator 29 moves towards turbine 20. When stator 29 and thrust washer 32 are pushed towards impeller 18 in any other operation conditions, there is a clearance between radially inner connectors 64 and impeller 18 near slot 72.

FIG. 2 shows a thrust washer 32*a* in accordance with an embodiment of the present invention. Thrust washer 32*a* includes an annular base 80 including an inner circumference 82, an outer circumference 84 and a plurality of radially extending groove on axial thrust surface 36 extending from inner circumference 82 to outer circumference 84. Extending radially inward from inner circumference 82, thrust washer 32*a* includes four radially protruding arms 86 supporting radially inner connectors 64 on the radially inner end thereof. As noted above, connectors 64 each include an axially extending section 66 and a radially outwardly projecting protrusion 70 for snap fitting thrust washer 32*a* onto impeller 18. Extending radially outward from outer circumference 84, thrust washer 32*a* includes four radially protruding arms 88 supporting radially outer connectors 44 on the radially outer end thereof. As noted above, connectors 44 each include an axially extending section 48 and a radially inwardly projecting protrusion 54 for snap fitting thrust washer 32*a* onto centering plate 34.

Figure 3:
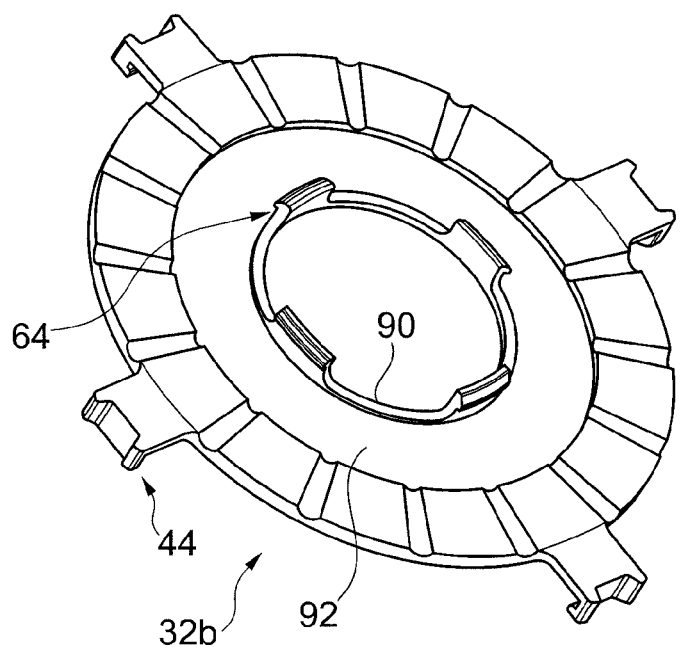
FIG. 3 shows a thrust washer in accordance with another embodiment of the present invention.

FIG. 3 shows a thrust washer 32*b* in accordance with another embodiment of the present invention. Thrust washer 32*b* is formed in substantially the same manner as thrust washer 32*a*, except that instead of including radially inward protruding arms 86, an inner circumference 90 is further radially inward such that connectors 64 are formed on inner circumference 90 of an annular base 92.

Figure 4:
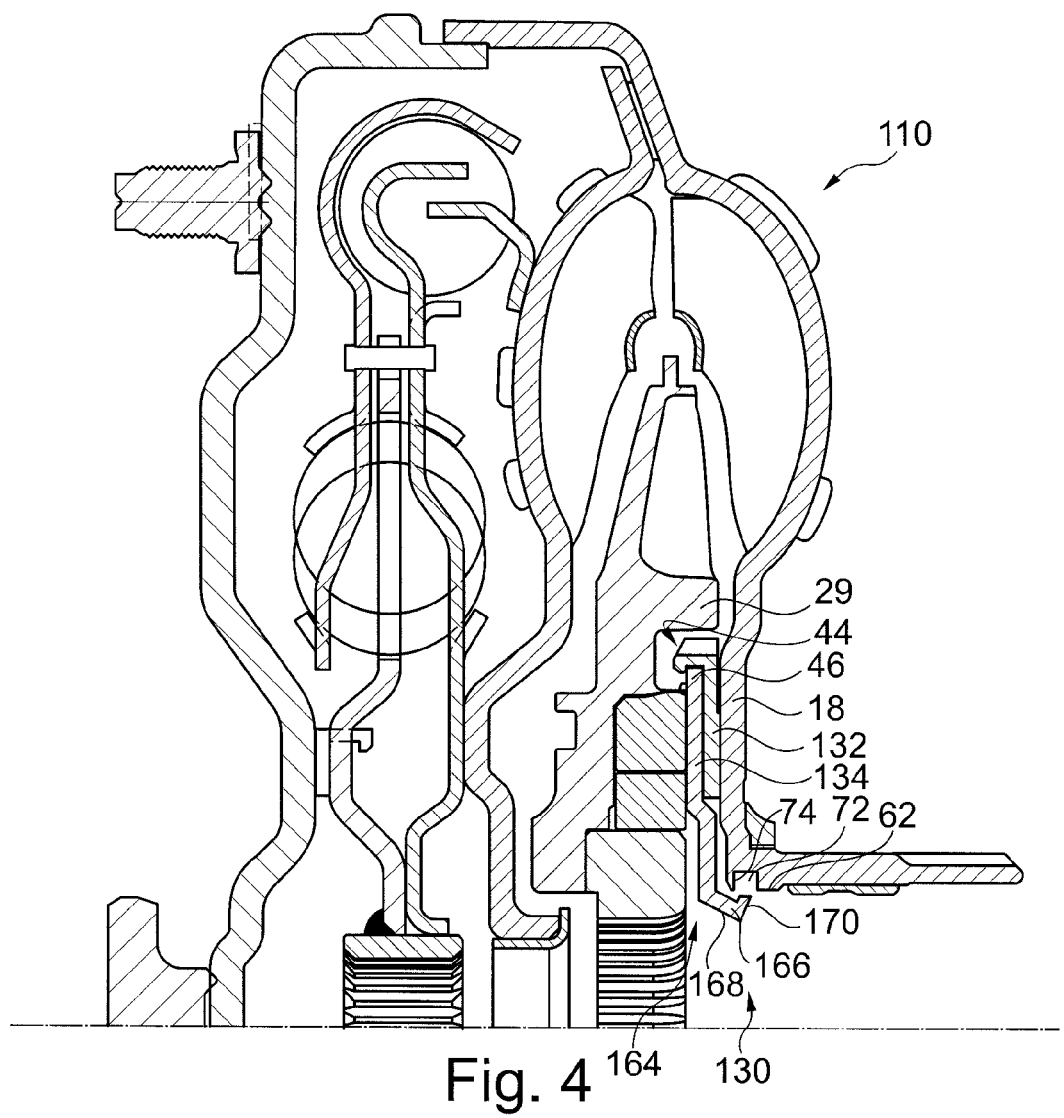
FIG. 4 shows a torque converter in accordance with another embodiment of the present invention.

FIG. 4 shows a torque converter 110 in accordance with another embodiment of the present invention. Torque converter 110 is configured in the same manner as torque converter 10, except that in place of thrust assembly 30, torque converter 110 includes a thrust assembly 130 connected to both stator 29 and impeller 18. Thrust assembly 130 includes a thrust washer 132 and a centering plate 134. As with thrust washer 32, thrust washer 132 includes radially outer connectors 44 snap-fit onto radially outer end 46 of centering plate 134. In contrast to thrust assembly 30, thrust assembly 130 is connected to impeller 18 via centering plate 134. Thrust washer 132 thus grips and contacts centering plate 134 and centering plate 134 grips and contacts impeller 18 if stator 29 tries to move toward turbine 20.

More specifically, centering plate 134 includes a radially inner connectors 164 connected to an inner circumferential surface 62 of impeller 18. Radially inner connectors 164 are snap-fit onto inner circumferential surface 62 of impeller 18 such that an axially extending section 166 defining an inner radial surface 168 of centering plate 134 contacts inner circumferential surface 62 of impeller 18 and a radially outward projecting protrusion 170 extends from the free end of axially extending section 166 to extend into radially and circumferentially extending annular slot 72 formed in inner circumferential surface 62 to secure centering plate 134 axially on impeller 18 to prevent thrust assembly 130 from moving away from impeller 18. More specifically, to prevent thrust assembly 130 from moving away from impeller 18, impeller 18 includes axial edge 74 defining slot 72 that contacts protrusion 170. When stator 29 axially thrusts against impeller 18, clearance 76 is formed between axial edge 74 and protrusion 170. In FIG. 4, connector 164 is shown bent away from slot 72, illustrating a position of connector 164 before impeller 18 is brought into engagement with thrust assembly 130 during assembly of torque converter 110. After impeller 18 is brought into engagement with thrust assembly 130 a tooling is used to push axially extending section 166 and protrusion 170 and bend connector 164 such that protrusion 170 is received in slot 72.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
an impeller;
a stator; and
a thrust assembly connected to both the stator and the impeller, the thrust assembly including an axial thrust surface for axially contacting an axial surface of a radially extending wall of the impeller, the thrust assembly including a radially inner connector axially fixed at an inner circumferential surface of the impeller to limit axial movement of a radially inner end of the thrust assembly away from the impeller.

2. The torque converter as recited in claim 1 wherein the inner circumferential surface of the impeller includes a slot therein for receiving the radially inner connector.

3. The torque converter as recited in claim 2 wherein the radially inner connector is snap fit onto the inner circumferential surface of the impeller.

4. The torque converter as recited in claim 1 wherein the thrust assembly includes a thrust washer, the thrust washer including the radially inner connector.

5. The torque converter as recited in claim 4 wherein the stator includes a one-way clutch and the thrust assembly includes a centering plate axially securing the one-way clutch, the thrust washer including a radially outer connector connected to the centering plate, the thrust washer being axially constrained to the impeller via the radially inner connector.

6. The torque converter as recited in claim 5 wherein the radially outer connector is snap-fit onto a radially outer end of the centering plate.

7. The torque converter as recited in claim 2 wherein the stator includes a one-way clutch and the thrust assembly includes a centering plate axially securing the one-way clutch, the centering plate including the radially inner connector.

8. The torque converter as recited in claim 7 wherein the radially inner connector is pushed into the slot in the impeller.

9. The torque converter as recited in claim 7 wherein the thrust assembly includes a thrust washer including the thrust surface, the thrust washer being snap-fit onto the centering plate.

10. The torque converter as recited in claim 1 further comprising an axially movable turbine for engaging and disengaging the impeller so as to form a lock up clutch.

11. The torque converter as recited in claim 1 wherein the radially inner connector includes an axially extending section defining an inner radial surface of the thrust assembly and a radially outward projecting protrusion extending from a free end of the axially extending section to extend into a radially and circumferentially extending slot formed in the inner circumferential surface of the impeller to secure the thrust assembly axially on the impeller.

12. The torque converter as recited in claim 11 wherein the impeller includes an axial edge defining the radially and circumferentially extending slot configured for contacting the radially outward projecting protrusion to prevent the radially inner end the thrust assembly from moving towards a turbine of the torque converter.

13. The torque converter as recited in claim 12 wherein the thrust assembly and impeller are configured such that when the stator axially thrusts against the impeller, a clearance is formed between the axial edge and the radially outward projecting protrusion.

14. A method of forming a torque converter comprising:
connecting a thrust assembly to a stator; and
connecting an impeller to the thrust assembly, the thrust assembly including a centering plate, the connecting the thrust assembly to the stator including connecting the centering plate to the stator such that the centering plate fixes a one-way clutch within the stator.

15. The method as recited in claim 14 wherein the thrust assembly includes a thrust washer, the connecting the thrust assembly to the stator including connecting the thrust washer to the centering plate.

16. The method as recited in claim 15 wherein the connecting the thrust washer to the centering plate includes snap-fitting the thrust washer to the centering plate.

17. The method as recited in claim 14 wherein the connecting the impeller to the thrust assembly includes snap-fitting a radially inner connector of the thrust assembly to an inner circumferential surface of the impeller.

18. The method as recited in claim 14 wherein the thrust assembly includes a thrust washer, the connecting the impeller to the thrust assembly including connecting the thrust washer to the impeller.

19. A method of forming a torque converter comprising:
connecting a thrust assembly to a stator; and
connecting an impeller to the thrust assembly, wherein the thrust assembly includes a centering plate, the connecting the impeller to the thrust assembly including connecting the centering plate to the impeller.

20. The method as recited in claim 19 wherein the connecting the centering plate to the impeller includes pushing a radially inner end of the centering plate into a slot formed in an inner circumferential surface of the impeller.

* * * * *